US011486309B2

(12) United States Patent
Ryon et al.

(10) Patent No.: US 11,486,309 B2
(45) Date of Patent: Nov. 1, 2022

(54) AXIALLY ORIENTED INTERNALLY MOUNTED CONTINUOUS IGNITION DEVICE: REMOVABLE HOT SURFACE IGNITER

(71) Applicant: Delavan Inc., Des Moines, IA (US)

(72) Inventors: Jason Ryon, Carlisle, IA (US); Lev Alexander Prociw, Johnston, IA (US); Brandon P. Williams, Johnston, IA (US)

(73) Assignee: Delavan Inc., Des Moines, IA (US)

( * ) Notice: Subject to any disclaimer, the term of this patent is extended or adjusted under 35 U.S.C. 154(b) by 7 days.

(21) Appl. No.: 17/125,083

(22) Filed: Dec. 17, 2020

(65) Prior Publication Data

US 2022/0195934 A1 Jun. 23, 2022

(51) Int. Cl.
*F02C 7/264* (2006.01)
*F02C 7/22* (2006.01)
*F23R 3/28* (2006.01)

(52) U.S. Cl.
CPC ............... *F02C 7/264* (2013.01); *F02C 7/22* (2013.01); *F23R 3/28* (2013.01);
(Continued)

(58) Field of Classification Search
CPC .. F02C 7/264; F02C 7/262; F02C 7/26; F02C 7/22; F02C 7/266; F23R 3/28; F23R 3/283; F23R 3/286; F23R 3/343; F05D 2260/99
See application file for complete search history.

(56) References Cited

U.S. PATENT DOCUMENTS 2,540,642 A  2/1951  Allen et al.
2,541,900 A  2/1951  Williams
(Continued)

FOREIGN PATENT DOCUMENTS

DE      1064760 B     9/1959
DE  102018214281 B3   8/2019
(Continued)

OTHER PUBLICATIONS

Extended European Search Report for EP Application No. 21192156.4, dated Feb. 1, 2022, 7 pages.
(Continued)

*Primary Examiner* — Craig Kim
(74) *Attorney, Agent, or Firm* — Kinney & Lange, P.A.

(57) ABSTRACT

An embodiment of a combustor for a gas turbine engine includes a combustor case, a combustor liner disposed within the combustor case, a fuel nozzle at an upstream end of the combustor liner, a torch igniter at least partially within the combustor case, and a removable surface igniter. The torch igniter includes a combustion chamber, a cap configured to receive a fuel injector, a tip, an annular igniter wall extending from the cap to the tip and defining a radial extent of the combustion chamber, an aperture, a structural wall coaxial with and surrounding the igniter wall, and an outlet passage within the tip which fluidly connects the combustion chamber to the combustor. The torch igniter is configured to receive the removable surface igniter through the aperture. An internal end of the removable surface igniter extends through the aperture into the combustion chamber of the torch igniter.

18 Claims, 6 Drawing Sheets

(52) U.S. Cl.
CPC .... *F05D 2230/237* (2013.01); *F05D 2240/35* (2013.01); *F05D 2260/30* (2013.01); *F05D 2260/99* (2013.01); *F23R 2900/00017* (2013.01)

(56) References Cited

U.S. PATENT DOCUMENTS

| | | | |
|---|---|---|---|
| 2,645,082 A | 7/1953 | Sarto | |
| 2,648,951 A | 8/1953 | Mcdougal | |
| 2,811,676 A | 10/1957 | Smits | |
| 2,840,742 A | 6/1958 | Watters | |
| 2,847,826 A | 8/1958 | Dennis | |
| 2,864,234 A | 12/1958 | Seglem et al. | |
| 2,885,859 A | 5/1959 | Barberis | |
| 2,958,196 A | 11/1960 | Wie et al. | |
| 2,967,224 A | 1/1961 | Irwin | |
| 3,009,321 A | 11/1961 | Jones et al. | |
| 3,487,636 A | 1/1970 | Scott et al. | |
| 3,558,251 A | 1/1971 | Bauger et al. | |
| 3,690,093 A | 9/1972 | Carlisle | |
| 3,898,797 A | 8/1975 | Wood | |
| 3,954,389 A * | 5/1976 | Szetela | F23M 5/085 60/753 |
| 3,990,834 A | 11/1976 | Dubell et al. | |
| 4,012,904 A | 3/1977 | Nogle | |
| 4,099,373 A | 7/1978 | Griffin et al. | |
| 4,112,675 A | 9/1978 | Pillsbury et al. | |
| 4,192,139 A | 3/1980 | Buchheim | |
| 4,194,358 A | 3/1980 | Stenger | |
| 4,351,156 A * | 9/1982 | White | F23R 3/32 60/737 |
| 4,412,414 A | 11/1983 | Novick et al. | |
| 4,441,323 A | 4/1984 | Colley | |
| 4,860,533 A * | 8/1989 | Joshi | F02C 7/264 60/776 |
| 4,912,931 A | 4/1990 | Joshi et al. | |
| 4,915,615 A | 4/1990 | Kawamura et al. | |
| 5,085,040 A | 2/1992 | Tilston | |
| 5,390,855 A | 2/1995 | Mims et al. | |
| 5,469,700 A | 11/1995 | Corbett et al. | |
| 5,499,497 A | 3/1996 | Defreitas | |
| 5,636,511 A | 6/1997 | Pfefferle et al. | |
| 5,640,841 A | 6/1997 | Crosby | |
| 5,673,554 A * | 10/1997 | DeFreitas | F02P 23/045 60/776 |
| 5,695,328 A | 12/1997 | Defreitas et al. | |
| 5,720,163 A | 2/1998 | Pfefferle et al. | |
| 5,845,480 A | 12/1998 | Defreitas et al. | |
| 6,138,654 A | 10/2000 | Pretorius et al. | |
| 6,195,247 B1 | 2/2001 | Cote et al. | |
| 6,240,731 B1 | 6/2001 | Hoke et al. | |
| 6,247,300 B1 | 6/2001 | Muramatsu et al. | |
| 6,483,022 B1 | 11/2002 | Packard | |
| 6,884,967 B1 | 4/2005 | Leigh | |
| 6,915,638 B2 | 7/2005 | Runkle et al. | |
| 6,952,927 B2 | 10/2005 | Howell et al. | |
| 6,968,699 B2 | 11/2005 | Howell et al. | |
| 7,124,724 B2 | 10/2006 | Fleetwood | |
| 7,137,255 B2 | 11/2006 | Schmotolocha et al. | |
| 7,216,488 B2 | 5/2007 | Howell et al. | |
| 7,470,875 B1 | 12/2008 | Wilcox et al. | |
| 7,481,248 B2 | 1/2009 | Prociw et al. | |
| 7,637,094 B2 | 12/2009 | Costello et al. | |
| 8,365,710 B2 | 2/2013 | Lykowski et al. | |
| 8,713,944 B2 | 5/2014 | Bleeker | |
| 9,080,772 B2 * | 7/2015 | Prociw | F23R 3/14 |
| 9,135,755 B2 | 9/2015 | Youssef | |
| 9,279,398 B2 | 3/2016 | McAlister | |
| 9,413,141 B2 | 8/2016 | Leglaye et al. | |
| 9,453,491 B2 | 9/2016 | Tanaka et al. | |
| 9,476,399 B1 * | 10/2016 | Munson | F02P 23/00 |
| 9,567,912 B2 | 2/2017 | Prociw et al. | |
| 10,041,859 B2 | 8/2018 | Desilva et al. | |
| 10,156,189 B2 | 12/2018 | Sze et al. | |
| 10,488,047 B2 | 11/2019 | Ott et al. | |
| 10,584,639 B2 * | 3/2020 | Dam | F23D 11/402 |
| 10,711,699 B2 | 7/2020 | Dam et al. | |
| 10,823,398 B2 * | 11/2020 | Choudhri | F02K 9/95 |
| 11,209,164 B1 * | 12/2021 | Ryon | F23R 3/283 |
| 11,226,103 B1 * | 1/2022 | Ryon | F02C 3/04 |
| 11,255,535 B1 * | 2/2022 | Eckert | F24C 7/082 |
| 2002/0050061 A1 | 5/2002 | Komyoji et al. | |
| 2002/0162333 A1 | 11/2002 | Zelina | |
| 2004/0050061 A1 | 3/2004 | Schmotolocha et al. | |
| 2004/0168442 A1 | 9/2004 | Schmotolocha et al. | |
| 2005/0053876 A1 | 3/2005 | Joos et al. | |
| 2005/0166595 A1 | 8/2005 | Fletcher et al. | |
| 2005/0284442 A1 | 12/2005 | Stuttaford et al. | |
| 2006/0054233 A1 | 3/2006 | Prociw et al. | |
| 2006/0168967 A1 | 8/2006 | Simons et al. | |
| 2008/0036209 A1 | 2/2008 | Bulkovitch | |
| 2008/0141651 A1 | 6/2008 | Eason et al. | |
| 2009/0234555 A1 | 9/2009 | Williams et al. | |
| 2010/0071343 A1 * | 3/2010 | Yu | F02K 9/95 60/740 |
| 2010/0126617 A1 | 5/2010 | Stroempl et al. | |
| 2011/0088409 A1 | 4/2011 | Carlisle | |
| 2011/0113787 A1 | 5/2011 | Milosavljevic | |
| 2011/0247590 A1 | 10/2011 | Donovan | |
| 2012/0085468 A1 | 4/2012 | Walker | |
| 2012/0125008 A1 | 5/2012 | Prociw et al. | |
| 2013/0000323 A1 | 1/2013 | Kupratis | |
| 2013/0040255 A1 | 2/2013 | Shi et al. | |
| 2013/0143171 A1 | 6/2013 | Soda et al. | |
| 2014/0060063 A1 | 3/2014 | Boardman et al. | |
| 2014/0150401 A1 | 6/2014 | Venter | |
| 2014/0216384 A1 | 8/2014 | Tanaka et al. | |
| 2014/0366505 A1 * | 12/2014 | Prociw | F02C 7/266 60/39.821 |
| 2014/0366542 A1 | 12/2014 | Teets | |
| 2014/0366551 A1 | 12/2014 | Prociw et al. | |
| 2015/0036781 A1 | 2/2015 | Youssef | |
| 2015/0040575 A1 | 2/2015 | Martinez Fabre et al. | |
| 2015/0260406 A1 | 9/2015 | Carrere | |
| 2015/0275755 A1 | 10/2015 | Ogata et al. | |
| 2015/0275769 A1 | 10/2015 | Foutch et al. | |
| 2015/0308351 A1 * | 10/2015 | Sheridan | F01D 5/06 475/159 |
| 2015/0345426 A1 | 12/2015 | Houston et al. | |
| 2015/0345788 A1 * | 12/2015 | Miyata | C10J 3/726 431/353 |
| 2015/0354517 A1 | 12/2015 | Mansour et al. | |
| 2016/0003150 A1 | 1/2016 | Dicintio et al. | |
| 2016/0010559 A1 | 1/2016 | Hoke et al. | |
| 2016/0047318 A1 | 2/2016 | Dam et al. | |
| 2016/0084169 A1 | 3/2016 | Stuttaford et al. | |
| 2016/0169110 A1 | 6/2016 | Myers et al. | |
| 2016/0230993 A1 | 8/2016 | Dai et al. | |
| 2017/0138266 A1 | 5/2017 | Caples | |
| 2017/0145852 A1 | 5/2017 | McCune et al. | |
| 2017/0284298 A1 | 10/2017 | Suciu et al. | |
| 2017/0350590 A1 * | 12/2017 | Choudhri | F23D 14/02 |
| 2017/0356656 A1 | 12/2017 | Ogata et al. | |
| 2018/0003388 A1 * | 1/2018 | Park | F23R 3/34 |
| 2018/0010795 A1 | 1/2018 | Nath et al. | |
| 2018/0051710 A1 | 2/2018 | Takamura et al. | |
| 2018/0058224 A1 | 3/2018 | Jennings et al. | |
| 2018/0058331 A1 | 3/2018 | Barton et al. | |
| 2018/0058404 A1 | 3/2018 | Tibbs | |
| 2018/0100437 A1 | 4/2018 | Dicintio et al. | |
| 2018/0134407 A1 | 5/2018 | Elbibary et al. | |
| 2018/0154446 A1 | 6/2018 | Brown et al. | |
| 2018/0170575 A1 | 6/2018 | Ziarno | |
| 2018/0172271 A1 | 6/2018 | Moniz et al. | |
| 2018/0179896 A1 | 6/2018 | Pal et al. | |
| 2018/0179956 A1 | 6/2018 | Wertz | |
| 2018/0283692 A1 | 10/2018 | Ryon et al. | |
| 2018/0356095 A1 | 12/2018 | Patel et al. | |
| 2018/0363555 A1 | 12/2018 | Zelina et al. | |
| 2019/0010872 A1 * | 1/2019 | Dam | F23R 3/14 |
| 2019/0024897 A1 | 1/2019 | Prociw et al. | |
| 2019/0032561 A1 * | 1/2019 | Stoia | F23R 3/42 |
| 2019/0178497 A1 | 6/2019 | Jones et al. | |
| 2019/0249877 A1 | 8/2019 | Fryer | |

(56) References Cited

U.S. PATENT DOCUMENTS

| | | | |
|---|---|---|---|
| 2020/0080530 A1 | 3/2020 | Freer et al. | |
| 2020/0088409 A1 | 3/2020 | Greenfield et al. | |
| 2020/0191059 A1 | 6/2020 | Ryon et al. | |
| 2020/0309378 A1* | 10/2020 | Dam | F23R 3/346 |
| 2020/0348024 A1 | 11/2020 | Hicks | |
| 2021/0215100 A1* | 7/2021 | Head | F23R 3/045 |
| 2022/0007488 A1* | 1/2022 | Bai | H05H 1/30 |

FOREIGN PATENT DOCUMENTS

| | | | |
|---|---|---|---|
| EP | 2189720 | A1 | 5/2010 |
| EP | 3128166 | A1 | 2/2017 |
| EP | 2677240 | B1 | 4/2020 |
| FR | 970988 | A | 1/1951 |
| FR | 1218296 | A | 5/1960 |
| GB | 693846 | A | 7/1953 |
| GB | 791990 | A | 3/1958 |
| GB | 819141 | A | 8/1959 |
| GB | 859184 | A | 1/1961 |
| JP | 2015021715 | A | 2/2015 |
| KR | 101279722 | B1 | 6/2013 |

OTHER PUBLICATIONS

Extended European Search Report for EP Application No. 21205393.8, dated Mar. 17, 2022, 8 pages.

Extended European Search Report for EP Application No. 21214883.7, dated May 13, 2022, pp. 10.

Extended European Search Report for EP Application No. 21201782.6, dated Mar. 28, 2022, 10 pages.

Extended European Search Report for EP Application No. 21205035.5, dated Mar. 28, 2022, 9 pages.

Extended European Search Report for EP Application No. 21214138.6, dated Apr. 25, 2022, 7 pages.

Extended European Search Report for EP Application No. 21212869.8, dated Apr. 28, 2022, pp. 7.

Extended European Search Report for EP Application No. 21213899.4, dated May 6, 2022, 8 pages.

Extended European Search Report for EP Application No. 21214511.4, dated Apr. 29, 2022, 8 pages.

Extended European Search Report for EP Application No. 21214798.7, dated May 11, 2022, 8 pages.

Extended European Search Report for EP Application No. 21214894.4, dated May 3, 2022, 9 pages.

"Metal Seal Design Guide—High Performance Engineered Seals and Sealing Systems", from Parker Hannlfin Corporation Composite Sealing Systems Division, 2016, 106 pages.

Database WPI—2017 Clarivate Analytics, Week 201919, Thomson Scientific, London GB; an 2019-17673XXP002806356, 2 pages.

Extended European Search Report for EP Application No. 21215655.8, dated May 2, 2022, 8 pages.

Extended European Search Report for EP Application No. 21215709.3, dated May 12, 2022, 9 pages.

Extended European Search Report for EP Application No. 21216163.2, dated May 16, 2022, 8 pages.

Extended European Search Report for EP Application No. 21209057.5, dated Jul. 19, 2022, 8 pages.

\* cited by examiner

AXIALLY ORIENTED INTERNALLY MOUNTED CONTINUOUS IGNITION DEVICE: REMOVABLE HOT SURFACE IGNITER

BACKGROUND

The present disclosure relates to gas turbine engines and, more particularly, to orientations of torch igniters used in the combustor section of a gas turbine engine.

Torch igniters can be used in lieu of spark igniters to provide an ignition source for combustors located in gas turbine engines. Torch igniters provide a flame as an ignition source for a combustor rather than the electric current provided by spark igniters. Torch igniters mounted externally to a high pressure case of the gas turbine engine must be able to withstand a high pressure differential to prevent leaks. Mounting torch igniters within a high pressure case of the gas turbine engine does not require the torch igniters to withstand this high pressure differential. However, internal mounting within the high pressure case decreases the accessibility of the torch igniters and various elements that interact with them.

SUMMARY

In one embodiment, the present specification provides a combustor of a gas turbine engine oriented about an engine axis that includes a combustor case extending along a primary combustor centerline to convey compressed airflow from a compressor to a turbine section, a combustor liner disposed within the combustor case to define a main combustor zone, a fuel nozzle situated at an upstream end of the combustor liner relative to the primary combustor centerline, a torch igniter situated at least partially within the combustor case, and a first removable surface igniter. The torch igniter includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one fuel injector, a tip defining the axially downstream end of the combustion chamber with respect to the torch igniter axis, an annular igniter wall extending along and surrounding the torch igniter axis from the cap to the tip and defining a radial extent of the combustion chamber, at least one aperture configured to receive a removable surface igniter, a structural wall coaxial with and surrounding the igniter wall, and an outlet passage defined by the igniter wall within the tip and fluidly connected to the combustion chamber. The torch igniter is configured to receive at least one removable surface igniter through the first aperture. The first removable surface igniter is connected to a power source and is situated such that a first external end of the first removable surface igniter is external to the combustor case and a first internal end of the first removable surface igniter extends through the first aperture into the combustion chamber of the torch igniter.

In another embodiment, the present specification provides a method of replacing a first removable surface igniter for a torch igniter within a gas turbine engine which includes disconnecting a power source from the first removable surface igniter, detaching a flange from a combustor case of the gas turbine engine, removing the first removable surface igniter from the torch igniter through a first opening of the combustor case, inserting a second removable surface igniter into the first opening, reattaching the flange to the combustor case, and connecting the power source to the second removable surface igniter. The combustor case includes the first opening configured to receive a removable surface igniter and extends along a primary combustor centerline to convey compressed airflow from a compressor to a turbine section. The torch igniter includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one fuel injector, a tip defining the axially downstream end of the combustion chamber with respect to the torch igniter axis, at least one aperture configured to receive a removable surface igniter, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber.

Figure 1:
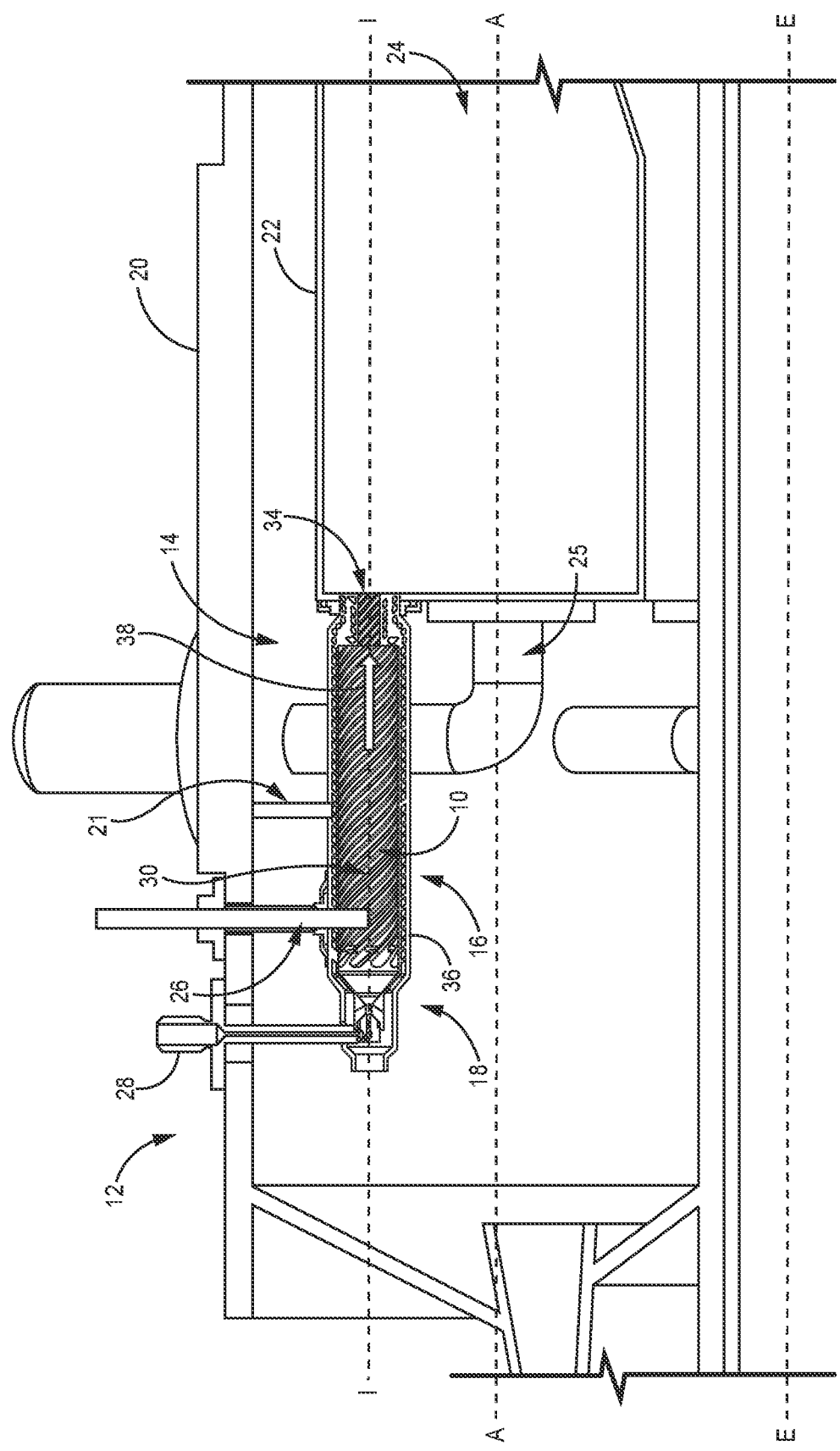
FIG. 1 is a cross-sectional view of an example of a torch igniter within the combustion section of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which also fall within the scope and spirit of the principles of the invention. The figures may not be drawn to scale, and applications and embodiments of the present invention may include features and components not specifically shown in the drawings.

DETAILED DESCRIPTION

The present disclosure provides structures and methods for replacing a removable hot surface igniter for a torch igniter within the combustor section of a gas turbine engine. The mounting of a torch igniter at least partially within the high-pressure section of a gas turbine engine prevents stress on the combustion chamber of the torch igniter, while situating a glow plug through the case of the high pressure section allows the glow plug to be removed for maintenance or other purposes.

FIG. 1 is a cross-sectional view of torch igniter 10 disposed within engine combustor section 12 of a gas turbine engine. Torch igniter 10 is composed of tip 14, combustion section 16, and cap 18. In the depicted embodiment, torch igniter 10 is situated within high pressure case 20 and attached to high pressure case 20 with attachment 21. However, torch igniter 10 can be situated only partially within high pressure case 20 in other embodiments (i.e. with only tip 14 and combustion section 16 internal to high pressure case 20). Tip 14 of torch igniter 10 is mounted through liner 22 of combustor 24. Fuel nozzle 25 provides fuel to combustor 24. The gas turbine engine is arranged such that high pressure case 20, liner 24, and combustor 26 are disposed circumferentially about engine axis E-E. Engine axis E-E is a rotational axis of the gas turbine engine. Primary combustor axis A-A is a centerline for the two-dimensional cross section of engine combustor section 12 shown in FIG. 1. The example of torch igniter 10 in FIG. 1 is shown as having glow plug 26. Glow plug 26 is a surface igniter which can be resistively heated to ignite fuel from fuel injector 28 and create combustion within torch igniter 10, creating a flame within combustion chamber 30. Torch igniter 10 intakes air from an inlet disposed in cap 18 of torch igniter 10. The air can be high-pressure air from the main compressor of the gas turbine engine, or can be air from another high-pressure air source such as an auxiliary compressor. Combustion chamber 30 is in fluid communication with an internal volume of combustor 24 via an outlet within tip 14, allowing the flame created within combustion chamber 30 to reach the interior of combustor 24 and thereby ignite fuel within combustor 24.

Igniter wall 32 (depicted in FIG. 2) is a housing which surrounds the internal volume of torch igniter 10, which includes combustion chamber 30 and outlet passage 34, such that igniter wall 32 runs from the end of tip 14 to cap 18. Igniter wall 32 can be annular where it surrounds combustion chamber 30 and outlet passage 34, and can be dome- or cone-shaped where it extends to cap 18. In the depicted example, igniter wall 32 has a larger diameter where it surrounds combustion section 16 than where it surrounds outlet passage 34. Structural wall 36 coaxially surrounds igniter wall 32, and can be separated from igniter wall 32 by cooling channels. Igniter wall 32 is shown transparent in the cross section of FIGS. 1 and 2 for ease of viewing.

Torch igniter 10 is arranged such that tip 14, combustion section 16, and cap 18 are all oriented coaxially about torch igniter axis I-I. Arrow 38 shows the general direction of flow for fluids within combustion chamber 30 of torch igniter 10. Thus, torch igniter 10 has upstream and downstream ends oriented along torch igniter axis I-I and according to the direction of arrow 38. Combustion chamber 30 and outlet passage 34 are fluidly connected such that combustion products are able to flow from combustion chamber 30 toward tip 14 and to outlet passage 34. Combustion products are able to exit torch igniter 10 and enter an internal volume of a main combustor, such as combustor 24, via outlet passage 34. To this extent, cap 18 is disposed at the upstream end of torch igniter 10 and tip 14 is disposed at the downstream end of torch igniter 10. It should be understood, however, that tip 14 can be disposed at any suitable location on the downstream end of torch igniter 10, including any location not coaxial with torch igniter axis I-I.

During operation, torch igniter 10 causes combustion within combustion chamber 30. Hot combustion products exit torch igniter 10 into combustor 24 via outlet passage 34. Due to the positioning of torch igniter 10 within high pressure case 20, the portion of torch igniter 10 internal to structural wall 36 experiences only slightly less pressure as the area external to structural wall 36 during operation.

Figure 2:
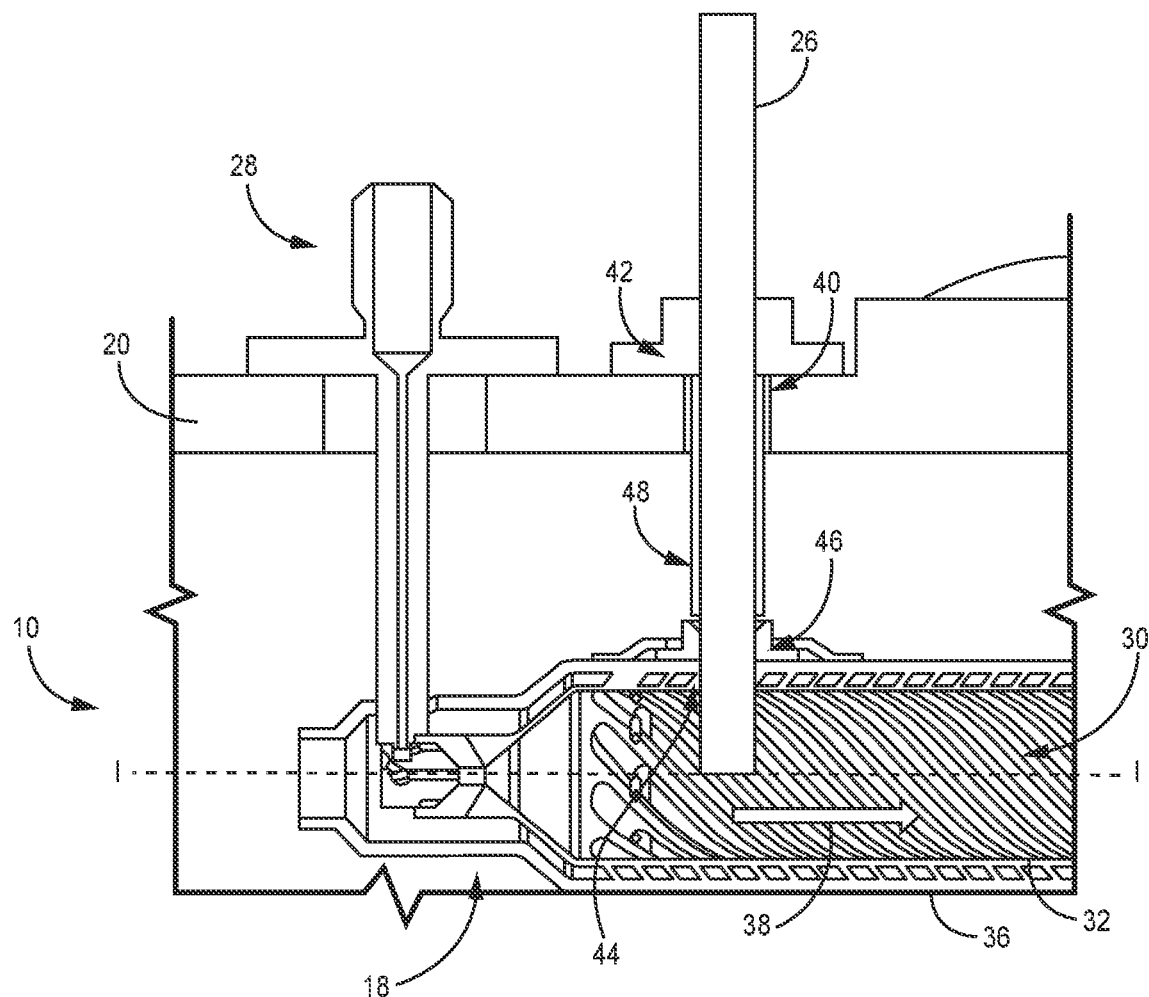
FIG. 2 is a cross-sectional view of an example of a cap section of the torch igniter of FIG. 1, illustrating a removable glow plug.

FIG. 2 is a cross-sectional view of torch igniter 10. Torch igniter 10 causes combustion within combustion chamber 30 by using fuel injector 28 to inject a spray of fuel-air mixture that impinges on the surface of glow plug 26. Glow plug 26 is positioned through opening 40 in high pressure case 20 and held in place within opening 40 by flange 42. Flange 42 is secured to high pressure case 20 with connectors, such as screw-on nuts, bolts, or screws, and creates a seal between glow plug 26 and high pressure case 20 through the use of any suitable seal, such as a C seal. Glow plug 26 is removably connected to aperture 44 of torch igniter 10 via seal 46 and extends into combustion chamber 30 of torch igniter 10 such that it has an internal end, a central region, and an external end with respect to torch igniter 10. In the depicted embodiment, the internal end of glow plug 26 extends into torch igniter 10 through structural wall 36 and igniter wall 32 axially downstream of cap 18 with respect to torch igniter axis I-I, and is oriented approximately perpendicular to torch igniter axis I-I. The central region of glow plug 26 is disposed radially inward of high pressure case 20 with respect to primary combustor centerline A-A. In the depicted embodiment, glow plug 26 intersects axis I-I, and is coaxially surrounded by sheath 48. Sheath 48 can be brazed to glow plug 26, and can extend along the length of glow plug 26 from high pressure case 20 to seal 46. Seal 46 is allowed to float with respect to aperture 44. In some embodiments, the external surface of sheath 48 can contain threads which interact with threads in opening 40. Sheath 48 is allowed to fit tightly within seal 46 to minimize air leaking into combustor section 30. Further, glow plug 26 can be resistively heated such that it is able to ignite the fuel-air mixture injected by fuel injector 28. Fuel injector 28 generally injects the fuel-air mixture in a conical volume centered on torch igniter axis I-I that impinges on the internal end of glow plug 26. Fuel injector 28 can be removably connected to an aperture in cap 18 or can be formed integrally to torch igniter 10.

To improve ignition of fuel injected by fuel injector 28, torch igniter 10 can be configured with multiple glow plugs 26 at multiple locations within combustion chamber 30. For example, an additional glow plug 26 could enter torch igniter 10 through an additional opening 40 at a different location on high pressure case 20 and an additional aperture 44 at a different location on torch igniter 10. Further, if the injection pattern of fuel injector 28 is distorted by coking, for example, using multiple glow plugs 26 at multiple locations within combustion chamber 30 can improve the likelihood that the injected fuel impinges on at least one glow plug 26.

Glow plug 26 is connected to a power source capable of delivering electric current to the external end of glow plug 26, allowing for the electrically-resistive heating of glow plug 26. In examples where torch igniter 10 contains multiple glow plugs 26, they can be connected to more than one power source or can be connected in series, parallel, or combination arrangement to a single power source. Generally, glow plug 26 is formed of a material capable of being resistively heated. For example, glow plug 26 can be formed of a ceramic material, such as silicon nitride. Glow plug 26 can contain a metallic element, such as copper, which can carry electric current from the power source to glow plug 26.

Figure 3:
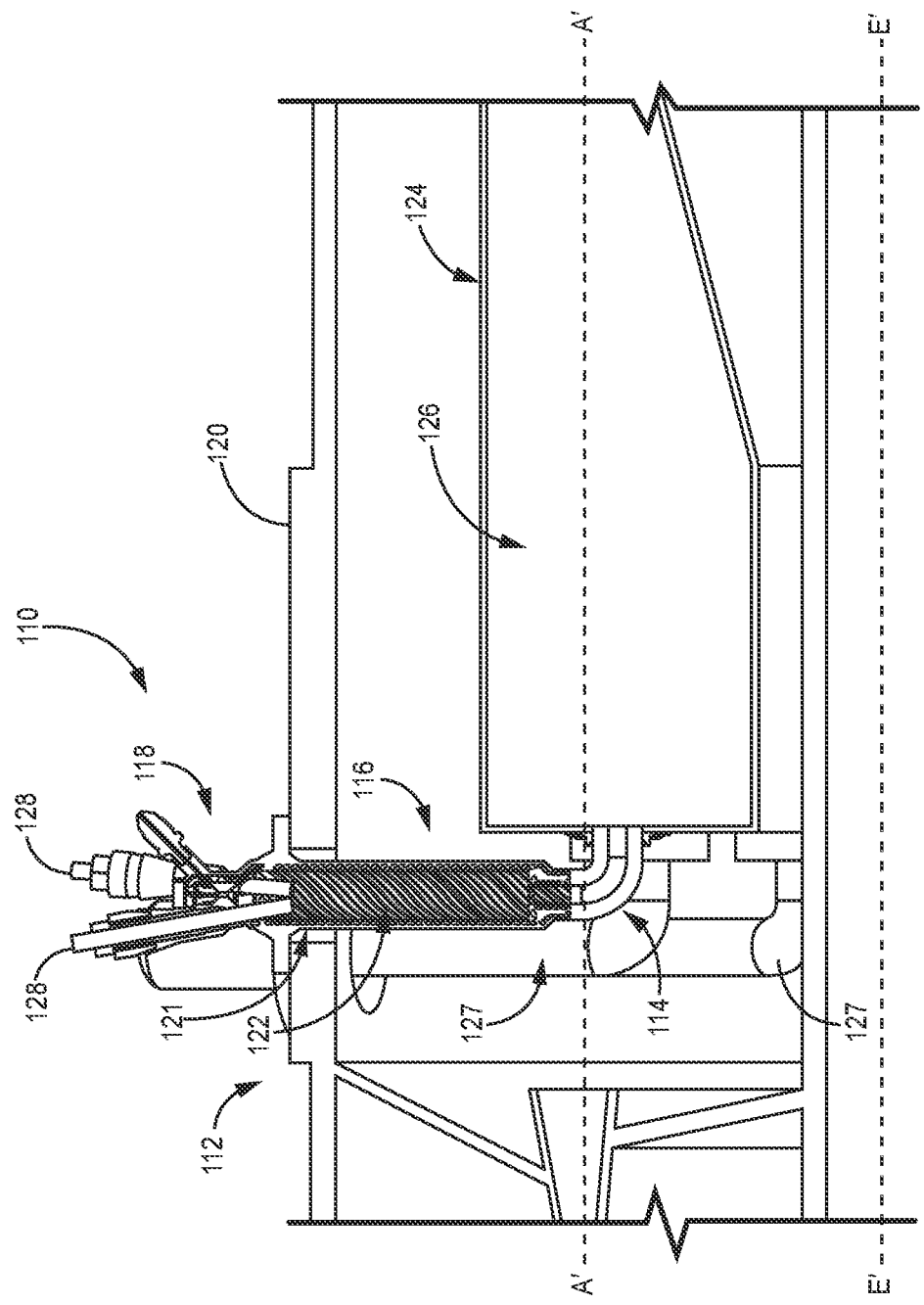
FIG. 3 is a cross-sectional view of an example of a torch igniter disposed partially within the combustion section of a gas turbine engine.

FIG. 3 is a cross-sectional view of torch igniter 110 partially disposed within engine combustor section 112 of a gas turbine engine. Torch igniter 110 is composed of tip 114, combustion section 116, and cap 118. Torch igniter 110 extends into high pressure case 120 through torch igniter opening 121, such that combustion chamber 122 of torch igniter 110 is located inside high pressure case 120. Tip 114 of torch igniter 110 is situated within high pressure case 120 and is mounted through liner 124 of combustor 126. Fuel nozzles 127 provide fuel to combustor 126. The gas turbine engine is arranged such that high pressure case 120, liner 124, and combustor 126 are disposed circumferentially about engine axis E'-E'. Engine axis E'-E' is a rotational axis of the gas turbine engine. Primary combustor centerline A'-A' is a centerline for the two-dimensional cross section of engine combustor section 112 shown in FIG. 3. Cap 118 of torch igniter 110 is situated outside high pressure case 120. The example of torch igniter 110 in FIG. 3 is shown as receiving glow plugs 128. Glow plugs 128 are surface igniters which can be resistively heated to ignite fuel from a fuel injector and create combustion within torch igniter 110, creating a flame within combustion chamber 22. Torch igniter 110 intakes air from an inlet disposed in cap 118 of torch igniter 110, and cap 118 is also configured to intake fuel from a fuel injector through fuel inlet fitting 130 (shown in FIG. 4). The air can be high-pressure air from the main compressor of the gas turbine engine or from an auxiliary compressor. Combustion chamber 122 is in fluid communication with an internal volume of combustor 126 via an outlet within tip 114, allowing the flame created within combustion chamber 122 to reach the interior of combustor 126 and thereby ignite fuel within combustor 126.

Figure 4:
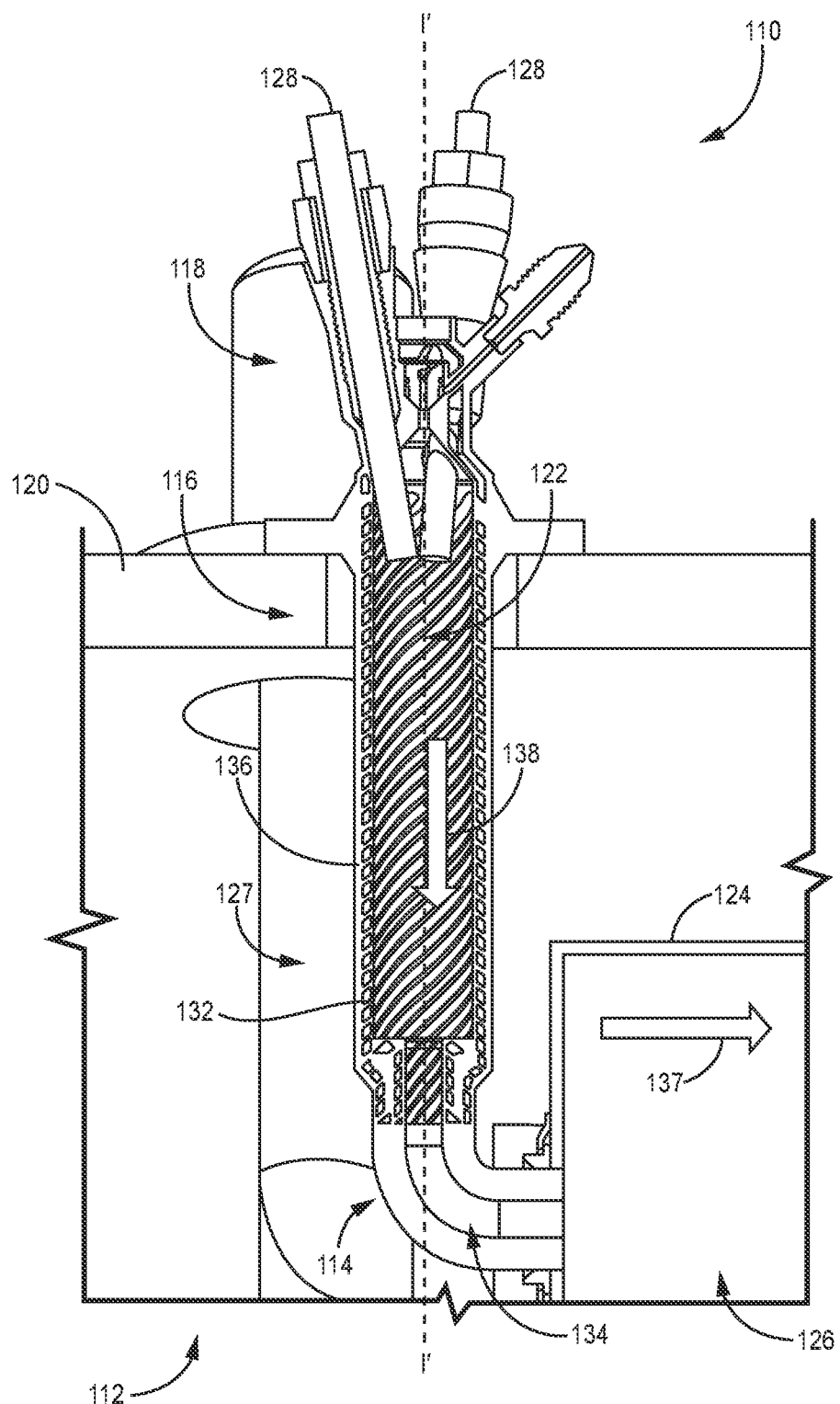
FIG. 4 is a cross-sectional view of the torch igniter of FIG. 3.

FIG. 4 is a cross-sectional view of torch igniter 110. Igniter wall 132 is a housing which surrounds the internal volume of torch igniter 110, which includes combustion chamber 122 and outlet passage 134, such that igniter wall 132 runs from the end of tip 114 to cap 118. Igniter wall 132 can be annular where it surrounds combustion chamber 122 and outlet passage 134, and can be dome- or cone-shaped where it extends to cap 118. In the depicted example, igniter wall 132 has a larger diameter where it surrounds combustion chamber 122 than where it surrounds outlet passage 134. Structural wall 136 coaxially surrounds igniter wall 132, and can be separated from igniter wall 132 by cooling channels. Igniter wall 132 is shown transparent in the cross section of FIGS. 3 and 4 for ease of viewing. Structural wall 136 can be thinner than would be required of structural walls for torch igniters mounted externally to high pressure case 120, because torch igniter 110 does not need to withstand the pressure difference between the air inside high pressure case 120 and the air outside high pressure case 120.

Combustor flow direction 137 shows the general direction of flow for fluids within engine combustor section 112. Torch igniter 110 is arranged such that combustion section 116 and cap 118 are oriented coaxially about torch igniter axis I'-I'. In the embodiment depicted in FIG. 4, torch igniter axis I'-I' is oriented approximately perpendicular to primary combustor centerline A'-A'. Igniter flow direction 138 shows the general direction of flow for fluids within combustion chamber 122 of torch igniter 110. Thus, torch igniter 110 has upstream and downstream ends oriented along torch igniter axis I'-I' and according to the direction of igniter flow direction 138. Combustion chamber 122 and outlet passage 134 are fluidly connected such that gases are able to flow from combustion chamber 122 toward tip 114 and to outlet passage 134. Gases are able to exit torch igniter 110 and enter an internal volume of a main combustor, such as combustor 126, via outlet passage 134. To this extent, cap 118 is disposed at the upstream end of torch igniter 110 and tip 114 is disposed at the downstream end of torch igniter 110. It should be understood, however, that tip 114 can be disposed at any suitable location on the downstream end of torch igniter 110.

Figure 5:
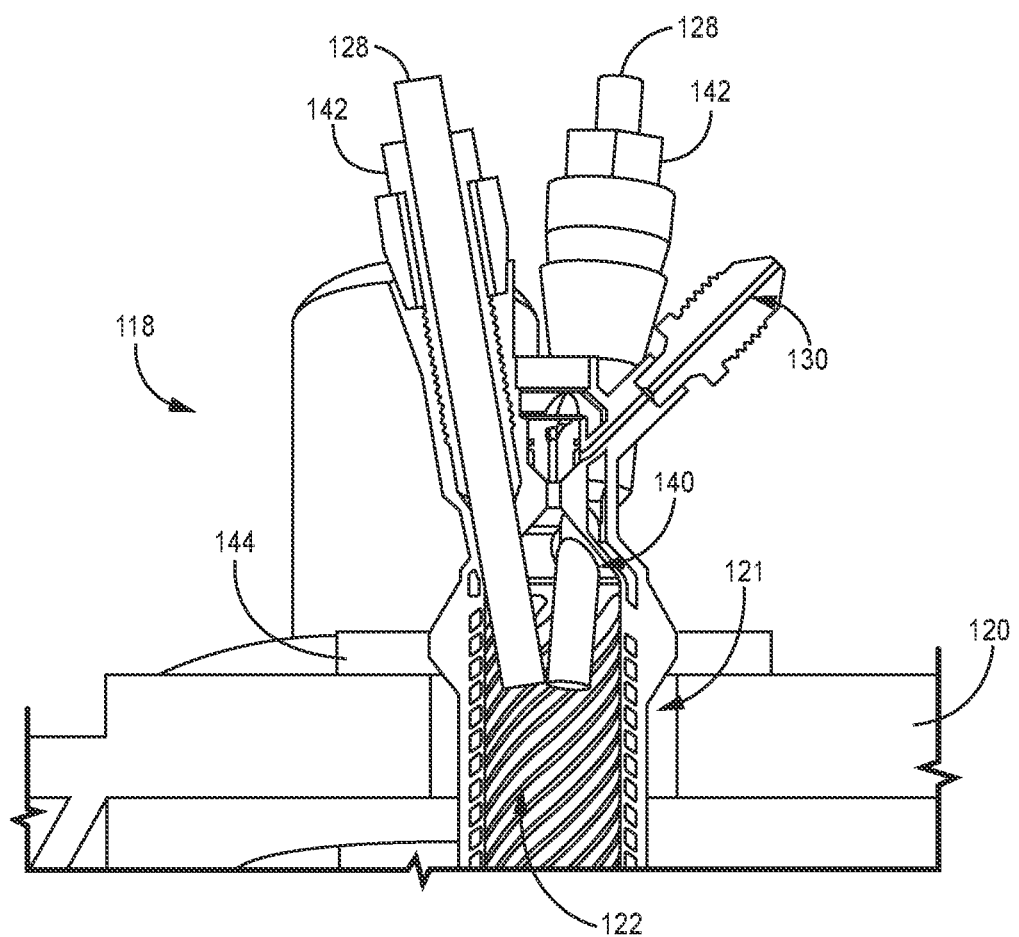
FIG. 5 is a cross-sectional view of a cap section of the torch igniter of FIG. 3, illustrating a removable glow plug arrangement.

FIG. 5 is a cross-sectional view of cap 118 of torch igniter 110. During operation, torch igniter 110 causes combustion within combustion chamber 122 by using a fuel injector to inject a fuel-air mixture that impinges on the surface of glow plug 128. Glow plugs 128 extend through cap 118, such that each glow plug 128 has an internal end and an external end with respect to torch igniter 110. Further, glow plugs 128 can be resistively heated such that they are able to ignite the fuel-air mixture injected through fuel inlet fitting 130 when the fuel-air mixture impinges on the internal ends of glow plugs 128. In the depicted embodiment, torch igniter 110 is configured to receive three glow plugs 128. However, in other embodiments, torch igniter 110 can be configured to receive one glow plug 128, two glow plugs 128, or more than three glow plugs 128.

Glow plugs 128 are also connected to a power source capable of delivering electric current to the external ends of glow plugs 128, allowing for the electrically-resistive heating of glow plugs 128. In examples where torch igniter 110 contains multiple glow plugs 128, they can be connected to more than one power source or can be connected in series, parallel, or a combination of arrangements to a single power source. Generally, glow plugs 128 are formed of a material capable of being resistively heated. For example, glow plugs 128 can be formed of a ceramic material, such as silicon nitride. Glow plugs 128 can contain metallic elements, such as copper, which can carry electric current from the power source to glow plugs 128.

Glow plugs 128 are removably connected to cap 118 through aperture 140 and extend through aperture 140 into combustion chamber 122 of torch igniter 110 such that each glow plug 128 has an internal end, a central region, and an external end with respect to torch igniter 110. In the depicted embodiment, the internal ends of glow plugs 128 are situated axially downstream of cap 118 with respect to torch igniter axis I'-I', and glow plugs 128 extend radially inward towards torch igniter axis I'-I'. Each glow plug 128 can be coaxially surrounded by a sheath 142, which can be brazed to each glow plug 128. In some embodiments, the external surface of each sheath 142 can contain threads which interact with threads in aperture 140.

Torch igniter 110 is secured within torch igniter opening 121 by flange 144. Flange 144 circumferentially surrounds torch igniter 110. Flange 144 can be fastened to high pressure case 120 by one or more connectors such as screw-on nuts, bolts, screws, or C seals (not shown).

Figure 6:
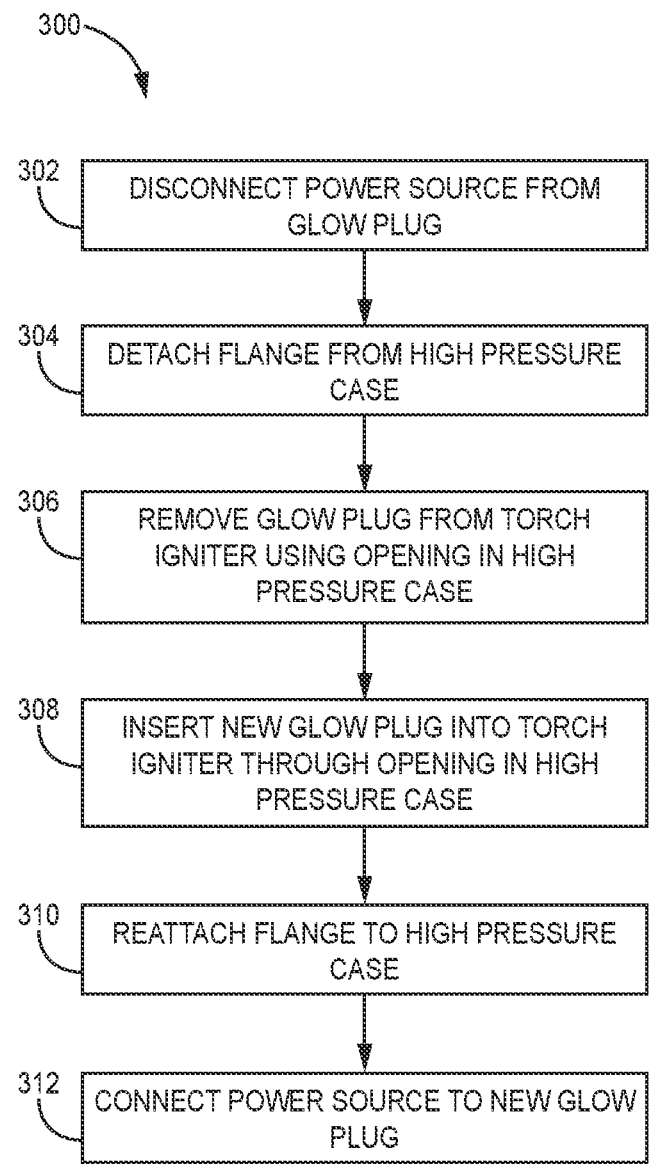
FIG. 6 is a flow chart depicting an example of a method of replacing a removable glow plug.

FIG. 6 is an example of method 300 of replacing a glow plug for a torch igniter within a gas turbine engine. Method 300 has steps of disconnecting a power source from a glow plug (step 302), detaching a flange from the high pressure case (step 304), removing the glow plug from the torch igniter using an opening in the high pressure case (step 306), inserting a new glow plug into the torch igniter through the opening in the high pressure case (step 308), reattaching the flange to the high pressure case (step 310), and connecting the power source to the new glow plug (step 312).

In step 302, a power source is disconnected from a glow plug. The power source is capable of delivering electric current to the external end of the glow plug. This electric current allows for the glow plug to be resistively heated during operation of the torch igniter. The glow plug can contain a metallic element, such as copper, which can carry electric current from the power source to the glow plug.

In step 304, a flange which secures the glow plug to the high pressure case is detached. The flange can be secured to the high pressure case with connectors such as bolts or screws. When the flange is secured to the case, it holds the glow plug in place and creates a seal between the glow plug and the opening in the high pressure case. Some embodiments can omit a flange, in which the glow plug can be threaded directly to the case through the opening, or directly into the cap of the torch igniter.

In step 306, the glow plug is removed from the torch igniter through the opening in the high pressure case. In some embodiments, the glow plug is surrounded coaxially by a sheath. The sheath and the glow plug can be brazed together, and the outer surface of the sheath can have threads which interact with threads in the opening of the high pressure case and the cap of the torch igniter. In embodiments containing a sheath, the glow plug and sheath are removed simultaneously from the opening of the high pressure case by unthreading the sheath from the opening.

In step 308, a new glow plug is inserted into the torch igniter through the opening in the high pressure case. It should be noted that the "new" glow plug is so named to differentiate it from the glow plug in the state in which it is removed from the torch igniter. The new glow plug can be, for example, a previously unused glow plug, a refurbished glow plug, or the original glow plug which has been cleaned or refurbished. As discussed above, if the glow plug is brazed to a threaded sheath, the glow plug and sheath are inserted by threading the sheath through the opening in the high pressure case.

In step 310, the flange is reattached to the high pressure case using the connectors noted in step 304. As noted above, the flange holds the glow plug in place within the opening in the high pressure case and creates a seal between the glow plug and the opening in the high pressure case.

In step 312, the power source is connected to the new glow plug which has been inserted into the torch igniter. As discussed above, the new glow plug can also contain a copper or other metallic element, which can be connected to the power source.

A glow plug which is removable from a torch igniter allows the use of partially or entirely internally mounted torch igniters within a high pressure case without sacrificing accessibility of the glow plug for maintenance, replacement, repair, or other purposes. Glow plugs can have shorter lifespans than other parts within the high pressure case, and it is advantageous to be able to remove them separately while leaving the high pressure case intact. For example, glow plugs might need to be replaced if their electrical connections burn out or otherwise stop functioning properly.

Discussion of Possible Embodiments

The following are non-exclusive descriptions of possible embodiments of the present invention.

A combustor of a gas turbine engine oriented about an engine axis according to an exemplary embodiment of this disclosure, among other possible things, includes a combustor case extending along a primary combustor centerline to convey compressed airflow from a compressor to a turbine section, a combustor liner disposed within the combustor case to define a main combustor zone, a fuel nozzle situated at an upstream end of the combustor liner relative to the primary combustor centerline, a torch igniter situated at least partially within the combustor case, and a first removable surface igniter which is connected to a power source. The torch igniter includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one fuel injector, a tip defining the axially downstream end of the combustion chamber with respect to the torch igniter axis, a first aperture configured to receive a removable surface igniter, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber. The torch igniter is configured to receive a first removable surface igniter through the first aperture. The first removable surface igniter is situated such that a first external end of the first removable surface igniter is external to the combustor case and a first internal end of the first removable surface igniter extends through the first aperture into the combustion chamber of the torch igniter.

The combustor of the preceding paragraph can optionally include, additionally and/or alternatively, any one or more of the following features, configurations and/or additional components:

A further embodiment of the foregoing combustor, wherein the torch igniter is situated entirely within the combustor case, the first external end of the first removable surface igniter extends through a first opening of the combustor case when the first internal end of the first removable surface igniter is received by the torch igniter through the first aperture, and a first central region of the first removable surface igniter is disposed radially inward of the first external end of the first removable surface igniter with respect to the primary combustor centerline and the torch igniter axis.

A further embodiment of any of the foregoing combustors, further comprising a flange which secures the first removable surface igniter within the first opening and creates a seal between the combustor case and the first removable surface igniter.

A further embodiment of any of the foregoing combustors, wherein the torch igniter axis is parallel to the primary combustor centerline.

A further embodiment of any of the foregoing combustors, wherein the first removable surface igniter is oriented perpendicular to the torch igniter axis and the primary combustor centerline.

A further embodiment of any of the foregoing combustors, further comprising a second removable surface igniter, wherein the torch igniter is configured to receive the second removable surface igniter and the second removable surface igniter is situated such that a second external end of the second removable surface igniter is external to the combustor case, a second internal end of the second removable surface igniter extends through a second aperture into the combustion chamber of the torch igniter, and a second central region of the second removable surface igniter is disposed radially inward of the second external end of the second removable surface igniter with respect to the primary combustor centerline and the torch igniter axis.

A further embodiment of any of the foregoing combustors, wherein the torch igniter is situated entirely within the combustor case and the second removable surface igniter extends through a second opening of the combustor case.

A further embodiment of any of the foregoing combustors, wherein a first sheath is coaxial to the first removable surface igniter.

A further embodiment of any of the foregoing combustors, wherein the first sheath extends from the first opening to the structural wall of the torch igniter.

A further embodiment of any of the foregoing combustors, wherein the first sheath is brazed to the first removable surface igniter.

A further embodiment of any of the foregoing combustors, wherein the first sheath contains surface threads which interact with surface threads in the first opening and the first aperture to secure the first removable surface igniter.

A further embodiment of any of the foregoing combustors, further comprising a second removable surface igniter and a second sheath which is coaxial to the second removable surface igniter, wherein the torch igniter is configured to receive the second removable surface igniter and a second internal end of the second removable surface igniter extends through a second aperture into the combustion chamber of the torch igniter.

A further embodiment of any of the foregoing combustors, wherein the torch igniter axis is perpendicular to the primary combustor centerline.

A further embodiment of any of the foregoing combustors, wherein the first removable surface igniter is connected to the power source by a metallic element.

An embodiment of a method of replacing a first removable surface igniter of a torch igniter includes, among other things disconnecting a power source from the first removable surface igniter, detaching a flange from a combustor case of the gas turbine engine, removing the first removable surface igniter from the torch igniter through a first opening of the combustor case, inserting a second removable surface igniter into the first opening, reattaching the flange to the combustor case, and connecting the electrical connection system to the second removable surface igniter. The combustor case includes the first opening configured to receive a removable surface igniter and extends along a primary combustor centerline to convey compressed airflow from a compressor to a turbine section. The torch igniter includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one fuel injector, a tip defining the axially downstream end of the combustion chamber with respect to the torch igniter axis, at least one aperture configured to receive a removable surface igniter, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber.

The method of the preceding paragraph can optionally include, additionally and/or alternatively, any one or more of the following features, configurations and/or additional components:

A further embodiment of the foregoing method, wherein the first removable surface igniter is surrounded coaxially by a first sheath and the second removable surface igniter is surrounded coaxially by a second sheath.

A further embodiment of any of the foregoing methods, wherein the first sheath is brazed to the first removable surface igniter and the second sheath is brazed to the second removable surface igniter.

A further embodiment of any of the foregoing methods, wherein the first sheath extends along the length of the first removable surface igniter such that the first sheath extends from the first opening to the first aperture when the first removable surface igniter is installed.

A further embodiment of any of the foregoing methods, wherein the first sheath and the second sheath contain surface threads which interact with surface threads in the first opening and the first aperture to allow the first removable surface igniter and the second removable surface igniter to be installed or removed.

A further embodiment of any of the foregoing methods, wherein disconnecting the power source from the first removable surface igniter comprises detaching a first metallic element of the first removable surface igniter from the power source and connecting the power source to the second removable surface igniter comprises attaching a second metallic element of the second removable surface igniter to the power source.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor of a gas turbine engine oriented about an engine axis, the combustor comprising:
   a combustor case extending along a primary combustor centerline to convey compressed airflow from a compressor to a turbine section;
   a combustor liner disposed within the combustor case to define a main combustor zone;
   a fuel nozzle situated at an upstream end of the combustor liner, relative to the primary combustor centerline;
   a first removable surface igniter connected to a power source; and
   a torch igniter situated at least partially within the combustor case, the torch igniter comprising:
      a combustion chamber extending along a torch igniter axis, the combustion chamber having axially upstream and downstream ends defining a flow direction through the combustion chamber with respect to the torch igniter axis;
      a cap defining the axially upstream end of the combustion chamber with respect to the torch igniter axis, wherein the cap is configured to receive at least one fuel injector;
      a tip defining the axially downstream end of the combustion chamber with respect to the torch igniter axis;
      an annular igniter wall extending along and surrounding the torch igniter axis from the cap to the tip and defining a radial extent of the combustion chamber;
      a first aperture configured to receive the first removable surface igniter;
      a structural wall coaxial with and surrounding the igniter wall; and
      an outlet passage defined by the igniter wall within the tip, wherein the outlet passage is fluidly connected to the combustion chamber;
   wherein the first removable surface igniter is situated such that a first external end of the first removable surface igniter is external to the combustor case, a first internal end of the first removable surface igniter extends through the first aperture into the combustion chamber of the torch igniter, the torch igniter is situated entirely within the combustor case, the first external end of the first removable surface igniter extends through a first opening of the combustor case when the first internal end of the first removable surface igniter is received by the torch igniter through the first aperture, and a first central region of the first removable surface igniter is disposed radially inward of the first external end of the first removable surface igniter with respect to the primary combustor centerline and the torch igniter axis.

2. The combustor of claim 1, further comprising a flange which secures the first removable surface igniter within the first opening and creates a seal between the combustor case and the first removable surface igniter.

3. The combustor of claim 1, wherein the torch igniter axis is parallel to the primary combustor centerline.

4. The combustor of claim 1, wherein the first removable surface igniter is oriented perpendicular to the torch igniter axis and the primary combustor centerline.

5. The combustor of claim 1, further comprising a second removable surface igniter, wherein the torch igniter is configured to receive the second removable surface igniter and the second removable surface igniter is situated such that a second external end of the second removable surface igniter is external to the combustor case, a second internal end of the second removable surface igniter extends through a second aperture into the combustion chamber of the torch igniter, a second central region of the second removable surface igniter is disposed radially inward of the second external end of the second removable surface igniter with respect to the primary combustor centerline and the torch igniter axis, and the second removable surface igniter extends through a second opening of the combustor case.

6. The combustor of claim 1, wherein a first sheath is coaxial to the first removable surface igniter.

7. The combustor of claim 6, wherein the first sheath extends from the first opening to the structural wall of the torch igniter.

8. The combustor of claim 7, wherein the first sheath is brazed to the first removable surface igniter.

9. The combustor of claim 8, wherein the first sheath contains surface threads which interact with surface threads in the first opening and the first aperture to secure the first removable surface igniter.

10. The combustor of claim 6, further comprising a second removable surface igniter and a second sheath which is coaxial to the second removable surface igniter, wherein the torch igniter is configured to receive the second removable surface igniter and a first internal end of the second removable surface igniter extends through a second aperture into the combustion chamber of the torch igniter.

11. The combustor of claim 1, wherein the torch igniter axis is perpendicular to the primary combustor centerline.

12. The combustor of claim 1, wherein the first removable surface igniter is connected to the power source by a metallic element.

13. A method of replacing a first removable surface igniter for a torch igniter within a gas turbine engine, the method comprising:
disconnecting a power source from the first removable surface igniter;
detaching a flange from a combustor case of the gas turbine engine, the combustor case comprising a first opening configured to receive a removable surface igniter, wherein the combustor case extends along a primary combustor centerline to convey compressed airflow from a compressor to a turbine section;
removing the first removable surface igniter from the torch igniter through the first opening, the torch igniter being situated entirely within the combustor case and comprising:
a combustion chamber extending along a torch igniter axis, the combustion chamber having axially upstream and downstream ends defining a flow direction through the combustion chamber with respect to the torch igniter axis;
a cap defining the axially upstream end of the combustion chamber with respect to the torch igniter axis, wherein the cap is configured to receive at least one fuel injector;
a tip defining the axially downstream end of the combustion chamber with respect to the torch igniter axis;
a first aperture configured to receive the first removable surface igniter;
an annular igniter wall extending along and surrounding the torch igniter axis from the cap to the tip and defining a radial extent of the combustion chamber;
a structural wall coaxial with and surrounding the igniter wall; and
an outlet passage defined by the igniter wall within the tip, wherein the outlet passage is fluidly connected to the combustion chamber;
inserting a second removable surface igniter into the first opening such that a second external end of the second removable surface igniter is external to the combustor case, a second internal end of the second removable surface igniter extends through the first aperture into the combustion chamber of the torch igniter, and a first central region of the first removable surface igniter is disposed radially inward of the first external end of the first removable surface igniter with respect to the primary combustor centerline and the torch igniter axis, wherein the second external end of the second removable surface igniter extends through the first opening of the combustor case when the second internal end of the second removable surface igniter is received by the torch igniter through the first aperture;
reattaching the flange to the combustor case, and
connecting the power source to the second removable surface igniter.

14. The method of claim 13, wherein the first removable surface igniter is surrounded coaxially by a first sheath and the second removable surface igniter is surrounded coaxially by a second sheath.

15. The method of claim 14, wherein the first sheath is brazed to the first removable surface igniter and the second sheath is brazed to the second removable surface igniter.

16. The method of claim 14, wherein the first sheath extends along the length of the first removable surface igniter such that the first sheath extends from the first opening to the first aperture when the first removable surface igniter is installed.

17. The method of claim 14, wherein the first sheath and the second sheath contain surface threads which interact with surface threads in the first opening and the first aperture to allow the first removable surface igniter and the second removable surface igniter to be installed or removed.

18. The method of claim 13, wherein disconnecting the power source from the first removable surface igniter comprises detaching a first metallic element of the first removable surface igniter from the power source and connecting the power source to the second removable surface igniter comprises attaching a second metallic element of the second removable surface igniter to the power source.

* * * * *